United States Patent
Bergano (10) Patent No.: US 10,873,390 B1
(45) Date of Patent: Dec. 22, 2020

(54) SYSTEM AND APPARATUS FOR DETECTING AND LOCATING EXTERNAL AGGRESSION ON AN UNDERSEA CABLE

(71) Applicant: SubCom, LLC, Eatontown, NJ (US)

(72) Inventor: Neal S. Bergano, Lincroft, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 16/433,398

(22) Filed: Jun. 6, 2019

(51) Int. Cl.
*H04B 10/07* (2013.01)

(52) U.S. Cl.
CPC .................................. *H04B 10/07* (2013.01)

(58) Field of Classification Search
None
See application file for complete search history.

(56) References Cited

U.S. PATENT DOCUMENTS

| | | | | |
|---|---|---|---|---|
| 6,608,587 | B1 * | 8/2003 | Sparrow | G01S 7/024 |
| | | | | 342/13 |
| 7,574,136 | B1 * | 8/2009 | Zhang | H04J 14/02 |
| | | | | 398/79 |
| 7,885,539 | B2 * | 2/2011 | Leppla | G01M 11/332 |
| | | | | 398/13 |
| 9,806,801 | B2 | 10/2017 | Maniloff | |
| 2007/0274712 | A1 * | 11/2007 | Leppla | G01M 11/332 |
| | | | | 398/20 |
| 2016/0087747 | A1 * | 3/2016 | Way | H04J 14/0221 |
| | | | | 398/81 |
| 2017/0019171 | A1 | 1/2017 | Doucet et al. | |

FOREIGN PATENT DOCUMENTS

KR  2010-0079635 A  7/2010

OTHER PUBLICATIONS

EP Extended Search Report from EP 20178526.8 dated Oct. 6, 2020, 8 pages.

* cited by examiner

*Primary Examiner* — David W Lambert (57) ABSTRACT

A novel system and apparatus for detecting and locating an external aggression on at least one optical cable of an optical communication system is provided. For example, a signal from a transmitter may be received and analysis may be performed to recover a state-of-polarization (SOP) associated with the signal. A first rapid polarization change that occurs may be identified, which may indicate that an external aggression has occurred on the at least one optical cable. A time offset between the first rapid polarization change and a second rapid polarization change may be used to estimate a location of the external aggression.

19 Claims, 6 Drawing Sheets

SYSTEM AND APPARATUS FOR DETECTING AND LOCATING EXTERNAL AGGRESSION ON AN UNDERSEA CABLE

BACKGROUND OF THE INVENTION

Field of the Invention

Embodiments of the present disclosure relate to the field of optical communication systems. More particularly, the present disclosure relates to a system and apparatus for detecting and locating an external aggression on an undersea optical cable.

Discussion of Related Art

In undersea optical fiber communication systems, numerous optical cables may be arranged along the seabed in various directions. Since the optical cables are exposed to the subsea environment, external damage to the cables may occur, some of which may be caused by different objects. For example, fishing trawlers may drag or pull trawls along the bottom of the sea and inadvertently cut or otherwise damage the optical cables. Moreover, anchors dragging along the sea floor may cause external damage to the cables. These types of external damage may be referred to as external aggression.

When external aggression occurs on an optical cable, it is important that the aggression is quickly located and repaired so that data transmission along the cable can resume. Because optical cables span large distances, however, pinpointing the location (or even the general vicinity) of the external aggression may be a tedious and time-consuming task.

It is possible to outfit an optical cable with sensors that can sense the external aggression. There are, however, at least two problems with this approach. First, costs associated with equipping each optical cable (among the many optical cables of a communication system) with the requisite number of sensors may be extremely high and difficult to justify. Second, many governments and regulatory bodies may not allow a cable to be outfitted with external sensors and make landfall in their jurisdictions.

Accordingly, there is a need for a system that can provide an early warning of an external aggression occurrence on an optical cable and the location (or the approximate location) of the external aggression without the use of any new sensors or undersea equipment on the cable.

SUMMARY OF THE INVENTION

An embodiment of the present disclosure is directed to a system for detecting and locating an external aggression on at least one optical cable. The system may include a first receiver having memory and one or more processors to receive a first signal transmitted from a first transmitter and perform analysis on the first signal to recover a first state-of-polarization (SOP) associated with the first signal. The one or more processors of the first receiver further determines whether a first rapid polarization change occurred during the recovery of the first SOP, where the first rapid polarization change indicates an external aggression has occurred on an optical cable, and the one or more processors also determines a first time or a first time period corresponding to the occurrence of the first rapid polarization change.

Moreover, the system includes a second receiver having memory and one or more processors to receive a second signal transmitted from a second transmitter and perform analysis on the second signal to recover a second SOP associated with the second signal. The one or more processors further determine whether a second rapid polarization change occurred during the recovery of the second SOP, where the second rapid polarization change indicates the external aggression has occurred on the optical cable, and further determines a second time or a second time period corresponding to the occurrence of the second rapid polarization change.

The system may determine a time offset between the first and second times or the first and second time periods corresponding to the occurrences of the first and second rapid polarization changes, respectively, and estimate a location of the external aggression on the optical cable based at least in part on the determined time offset.

Another embodiment of the present disclosure is directed to an apparatus for detecting and locating an external aggression on at least one optical cable. The apparatus may include memory and one or more processors to receive a signal and perform analysis on the signal to recover a state-of-polarization (SOP) associated with the signal. The apparatus further determines whether a first rapid polarization change occurred during the recovery of the SOP, where the first rapid polarization change indicates that the external aggression has occurred on the at least one optical cable, and also determines a first time or a first time period corresponding to the occurrence of the first rapid polarization change. A time offset may be determined by the apparatus to estimate the location of the external aggression.

Yet another embodiment of the present disclosure is directed to a method for detecting and locating an external aggression on at least one optical cable. The method may include receiving a signal from a transmitter, performing analysis on the signal to recover a state-of-polarization (SOP) associated with the signal, determining whether a first rapid polarization change occurred during the recovery of the SOP, where the first rapid polarization change indicates that an external aggression has occurred on the at least one optical cable, determining a first time or a first time period corresponding to the occurrence of the first rapid polarization change, and estimating a location of the external aggression on the at least one optical cable based at least in part on a time offset between the first time or first time period corresponding to the occurrence of the first rapid polarization change and a second time or a second time period corresponding to an occurrence of a second rapid polarization change.

DESCRIPTION OF EMBODIMENTS

The present invention is directed to a system and apparatus for detecting and locating an external aggression on an undersea optical cable in real-time or substantially real-time without adding any new components, devices, or costs to the existing optical fiber communication system. According to embodiments, in a bi-directional optical communication system, each receiver of a coherent transponder located at opposed terminals may detect and analyze a State-of-Polarization (SOP) of one or more signals transmitted on at least one optical fiber-pair connected therebetween. Based on the analysis, each receiver may determine whether a rapid fluctuation or a rapid polarization change in the SOP has occurred, the occurrence of which may indicate an external aggression on the cable. By observing a time offset of the polarization perturbation, e.g., the rapid polarization changes, between the two directions of propagation, the location of the external aggression may be estimated. For example, if the time offset is zero or approximately zero, then the location of the external aggression may be at or near the center of the cable.

As described above, outfitting an optical cable with sensors to detect an external aggression poses various problems, such as cost and regulatory compliance related issues. The one or more embodiments, examples, and/or aspects disclosed herein directed to a new and novel system for identifying and locating an external aggression on one or more subsea cables advantageously do not require any new equipment, components, sensors, etc. on the cable.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
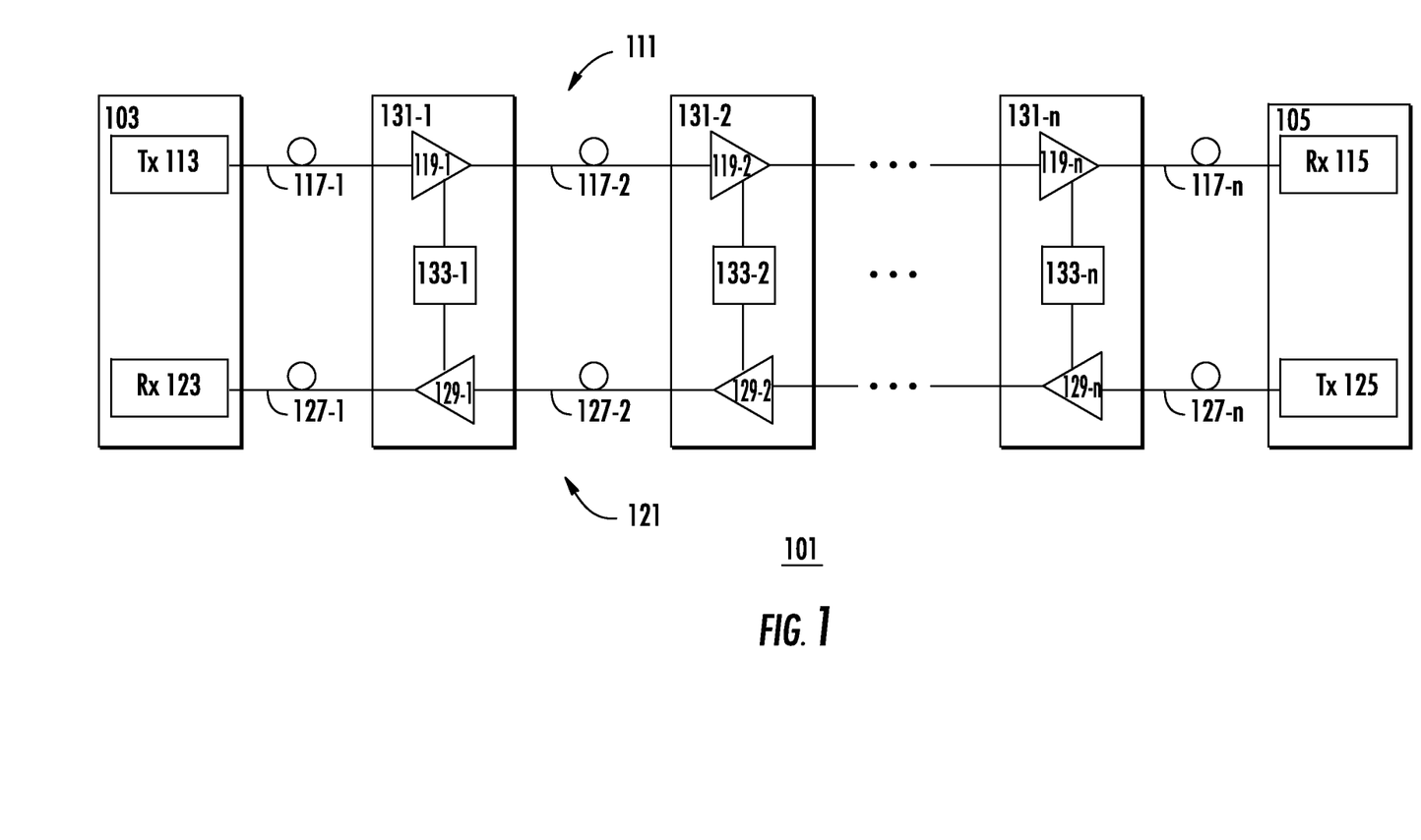
FIG. 1 illustrates an example optical communication system in accordance with one or more embodiments of the disclosure.

Referring to the drawings, FIG. 1 illustrates an example bi-directional optical communication system 101. The bi-directional optical communication system 101 may use high-bandwidth fiber optics to transmit vast amounts of data over long distances. Bi-directional data transmission may be implemented by constructing pairs of optical fiber paths within the cable and transmitting one or more wavelength division multiplexed channels per fiber pair.

As shown, the optical communication system 101 may include terminals 103 and 105 connected by two unidirectional optical paths 111, 121, which together form a bi-directional optical path pair. Optical path 111 may transmit information in one direction (e.g., to the right) from a transmitter 113 at terminal 103 to a receiver 115 at terminal 105. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each fiber pair and may include additional amplifiers for additional path pairs. The optical amplifiers 119, 129 may utilize EDFAs or other rare earth doped fiber amplifiers, Raman amplifiers or semiconductor optical amplifiers. A coupling path 133-1 to 133-$n$ may be coupled between optical paths 111, 121, for example, in one or more of the repeaters 131-1 to 131-$n$.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters.

Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory, for example, to identify and locate external aggressions based on State-of-Polarization (SOP) analyses, as will be further described below.

Figure 2:
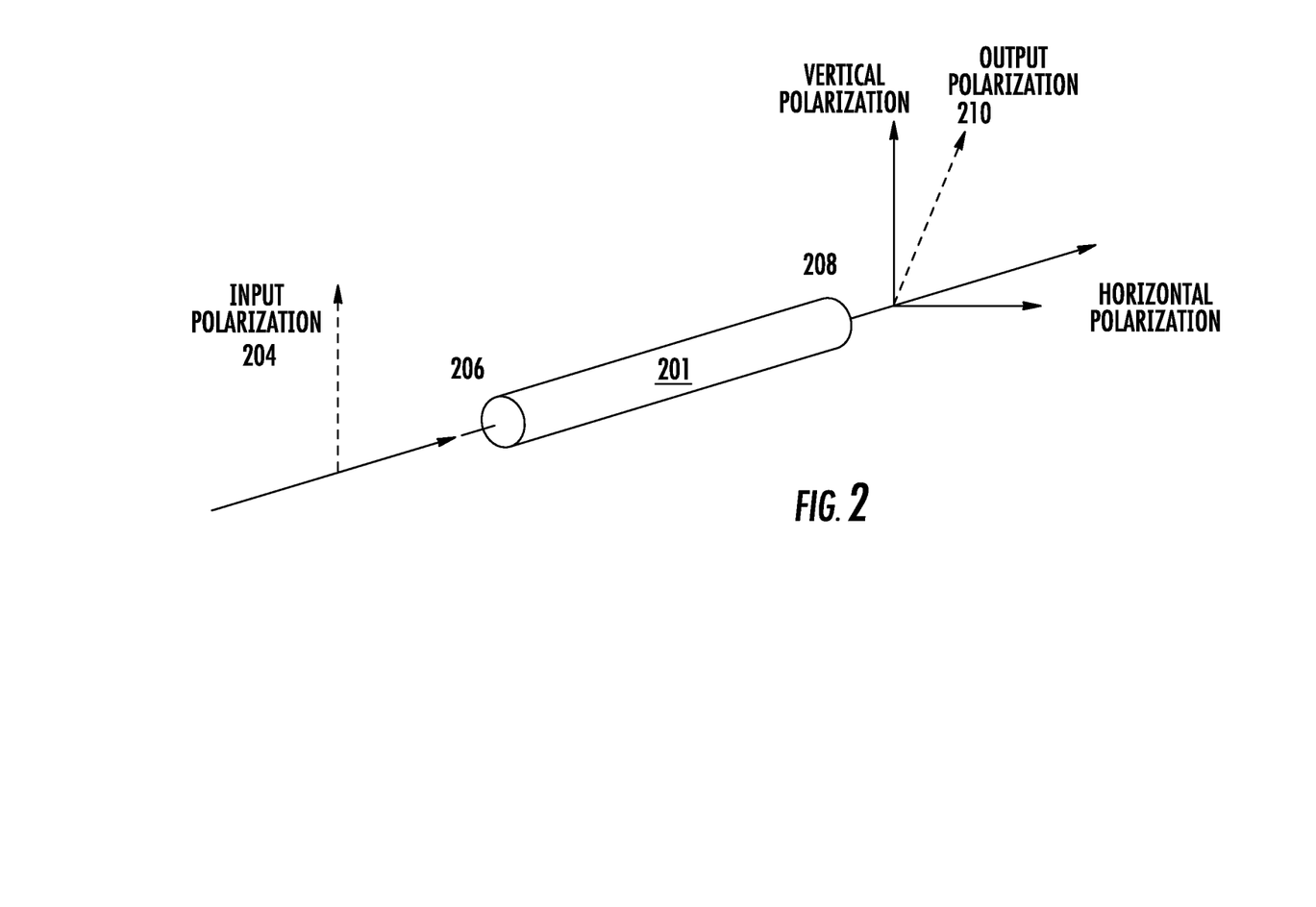
FIG. 2 illustrates example input and output polarizations of a transmission fiber in accordance with one or more embodiments of the disclosure.

FIG. 2 illustrates example input and output polarizations of a transmission fiber 201. According to an embodiment, the transmission fiber 201 may be a single-mode transmission fiber of an undersea optical communication system. It may be understood that single-mode transmission fibers do not maintain the State-of-Polarization (SOP). Thus, an optical fiber itself can be an effective sensor for detecting or identifying an external aggression since any mechanical and/or thermal perturbation causes a polarization change on the transmitted signal.

For example, as shown in FIG. 2, an input polarization 204 (which is depicted by a dashed arrow) at a transmitting end 206 of the transmission fiber 201 may have an initial position that is parallel to a vertical axis, e.g., a y-axis. At a receiving end 208 of the transmission fiber 201, an output polarization 210 (also depicted by a dashed arrow) has a position that is different than the initial position of the input polarization 204, e.g., the output polarization 210 is positioned at an angle relative to the vertical axis. This type of observed change, e.g., rapid changes, between the input SOP of the input polarization 204 and the output SOP of the output polarization 210 may indicate that a mechanical and/or thermal perturbation has occurred on the transmission fiber 201. By observing the output SOP for sudden or uncommon changes, such as a rapid fluctuation in the output SOP, it can be determined that an external aggression has likely occurred.

Figure 3:
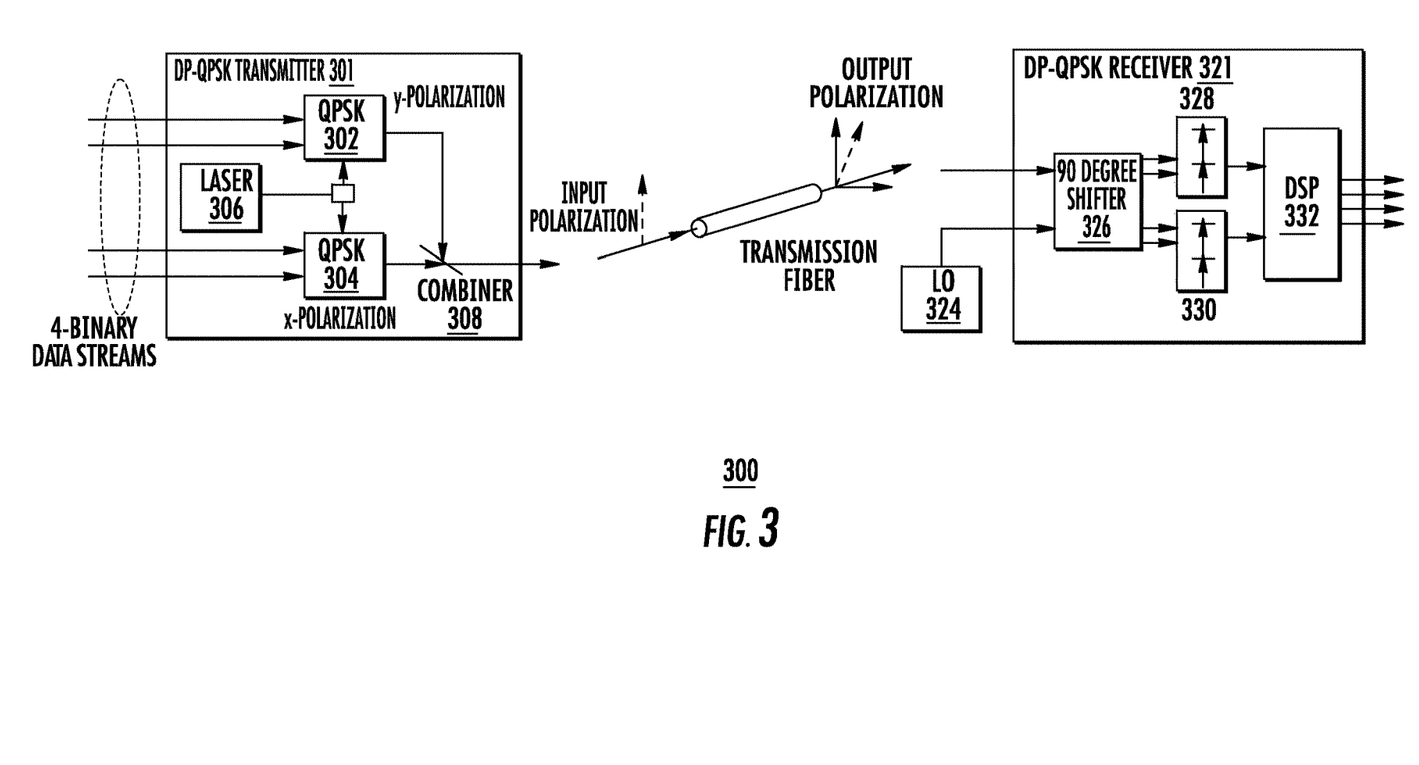
FIG. 3 illustrates an example data transmitter and receiver for detecting and locating an external aggression in accordance with one or more embodiments of the disclosure.

FIG. 3 illustrates an example transmitter-receiver system 300 for detecting and locating an external aggression. According to an embodiment, the transmitter-receiver system 300 may use or implement a dual-polarization quadrature phase shift keying (DP-QPSK) modulation format that operates, for example, at a predefined transmission rate (e.g., 100 GB/s per wavelength channel), where independent data streams are transmitted on two different polarizations (e.g., x and y polarizations). As shown, the transmitter is a DP-QPSK transmitter 301, which may be located at a first location, e.g., a first terminal, and the receiver is a DP-QPSK receiver 321, which may be located at a second location, e.g., a second terminal. It may be understood that the transmitter-receiver system 300 may be part of a bi-directional optical communication system, and thus, a second DP-QPSK transmitter (not shown) may be located at the second terminal and configured to transmit data to a second DP-QPSK receiver (not shown) located at the first terminal. The transmitter-receiver pair at each terminal may be included in the same housing as a coherent transponder.

The DP-QPSK transmitter 301 may include two different QPSK modulators 302 and 304. QPSK modulator 302 may receive two binary data streams and modulate, using at least laser 306, the data streams on y-polarization. Similarly, QPSK modulator 304 may also receive two binary data streams, but the QPSK modulator 304 is different in that it may modulate, using laser 306, the data streams on x-polarization. The two different polarizations may be input into a combiner 308 to provide a dual polarization signal, which is input at one end of a transmission fiber.

The DP-QPSK receiver 321 may include at least a 90-degree shifter 326 (such as a 90-degree optical hybrid), diode pairs 328, 330, and a digital signal processor (DSP) 332. Although FIG. 2 shows a local oscillator (LO) 324 arranged outside the DP-QPSK receiver 321, the LO 324 may be included in the DP-QPSK receiver 321 in some embodiments. As illustrated, the output polarization, which is output at the other end of the transmission fiber, along with a signal from a local oscillator (LO) 324 may be input to a 90-degree shifter 326, which outputs four shifted signals. The diode pairs 328 and 330 may receive these signals and, for instance, extract the modulation. The DSP 332 may then perform processing on the signals so that information contained therein can be further processed, displayed, analyzed, or converted into another signal that may be of use. For example, the DSP 332 may include a polarization recovery component or feature, as will be further described below. It may be understood that the DSP 332 can include memory for storing both program(s) and data, one or more compute engines (e.g., a processor), and input/output (I/O) for interfacing with external components, such as the diode pairs 328, 330.

Because random birefringence perturbations along the transmitter-receiver system 300 may mix the data streams or channels together as observed in a local reference frame of the DP-QPSK receiver 321 (e.g., horizontal and vertical polarizations), the receiver 321 may use the DSP 332 and other suitable hardware for real-time (or substantially real-time) DSP "intradyne" techniques to implement the "coherent" aspect of the signal detection process. Thus, the "intradyne receiver" may use a combination of optics and high-speed digital signal processing to detect the data transmitted in two polarizations. Moreover, as described above, the DP-QPSK receiver may be able to detect that an external aggression has occurred on the transmission fiber when the received SOP exhibits a rapid fluctuation of the SOP or any other observed rapid polarization change.

Figure 4:
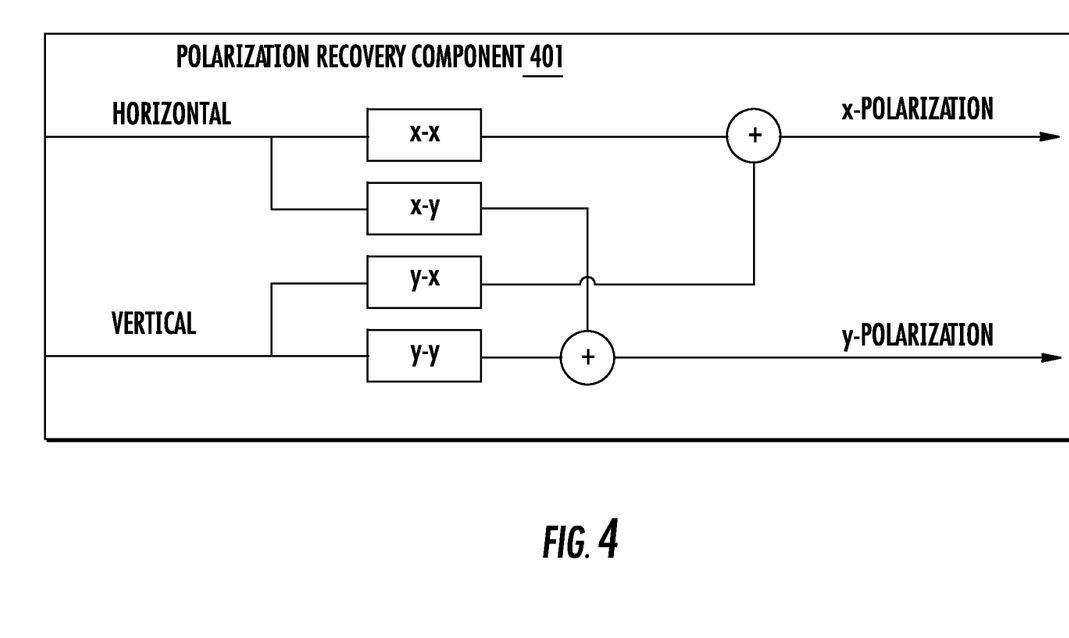
FIG. 4 illustrates an example polarization recovery component in accordance with one or more embodiments of the disclosure.

FIG. 4 illustrates an example polarization recovery component 401 according to embodiments. As described above, the polarization recovery component 401 may be implemented as software and/or hardware and may be included in or be a part of a digital signal processor of a coherent receiver of a transmitter-receiver system. For ease of explanation, the polarization recovery component 401 will be described in relation to the components and features of FIG. 3. It may be understood that, in an example, the polarization recovery feature show in FIG. 4 and described herein may be configured to recreate and/or recover original transmitted signals on the X and Y polarizations at the transmitter 301 from the received signals at receiver 321 as measured in the local reference frame of horizontal and vertical polarizations.

As shown, the horizontal and vertical polarizations received and detected by the DP-QPSK receiver 321 may be input into four different axes extraction components "x-x," "x-y," "y-x," and "y-y." The outputs of the "x-x" and the "y-x" components may be added together by an adder to recover data from the two binary data streams that were modulated on the x-polarization by the DP-QPSK transmitter 301. Moreover, the outputs of the "x-y" and "y-y" components may be added together by a different adder to recover data from the two binary data streams modulated on the y-polarization. Thus, the polarization recovery component 401, which may be part of the DSP 332 of the DP-QPSK receiver 321, may transform or recover the randomly changing received SOP (e.g., the horizontal and vertical polarizations) back to the original basis set (e.g., x and y polarizations) transmitted by the transmitter 301 to the receiver 321.

It may be understood the speed of the recovery process in the polarization recovery component 401 may need to be faster than any expected sudden change in the polarization of the signal, which may require a predefined polarization recovery bandwidth, such as 50 kHz.

Figure 5:
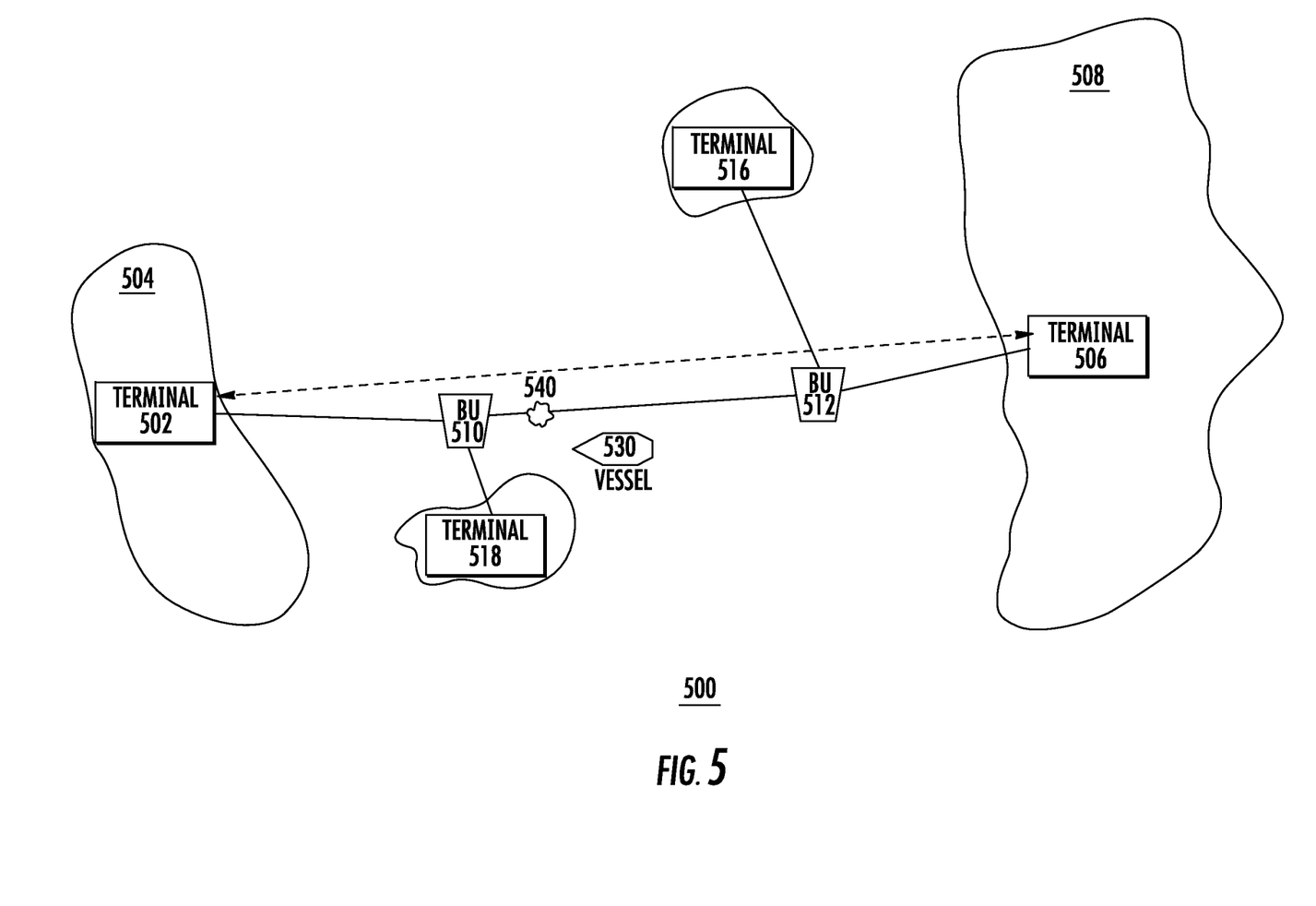
FIG. 5 illustrates an example external aggression on a cable of an undersea optical communication system in accordance with one or more embodiments of the disclosure.

FIG. 5 illustrates an example external aggression on an optical cable of an undersea optical communication system 500 according to embodiments. For ease of explanation, the communication system 500 may include one optical fiber pair and one bi-directional optical channel between terminals 502 and 506. Each terminal 502 and 506 may have at least one transponder that includes a transmitter (e.g., transmitter 301) and a receiver (e.g., receiver 321 with polarization recovery component 401) for communication along the fiber pair, as indicated by the dashed double-headed arrow. As shown, terminal 502 may be located at a location 504 (e.g., a landmass) and terminal 506 may be located at location 508 (e.g., a landmass). Moreover, the undersea optical communication system 500 may include two branching units 510 and 512, which allow branching connection(s) of other communication components to the communication system 500, e.g., via terminals 516 and 518 located at different landmasses.

A vessel 530, such as a fishing vessel, dragging or pulling a trawl along the bottom of the sea may inadvertently cut or otherwise damage the optical cable, which causes an external aggression 540. As illustrated, the aggression 540 may occur at a location on the cable between branching units 510 and 512 (e.g., closer to branching unit 510).

According to an embodiment, the coherent receivers located at terminals 502 and 506 may observe the received SOP for each direction that can be represented by a Stokes vector in 3-space (e.g., $S_{502\text{-}to\text{-}504}$ and $S_{504\text{-}to\text{-}502}$). Thus, the external aggression 540 may cause a rapid fluctuation of the received SOP in each receiver.

Figure 6:
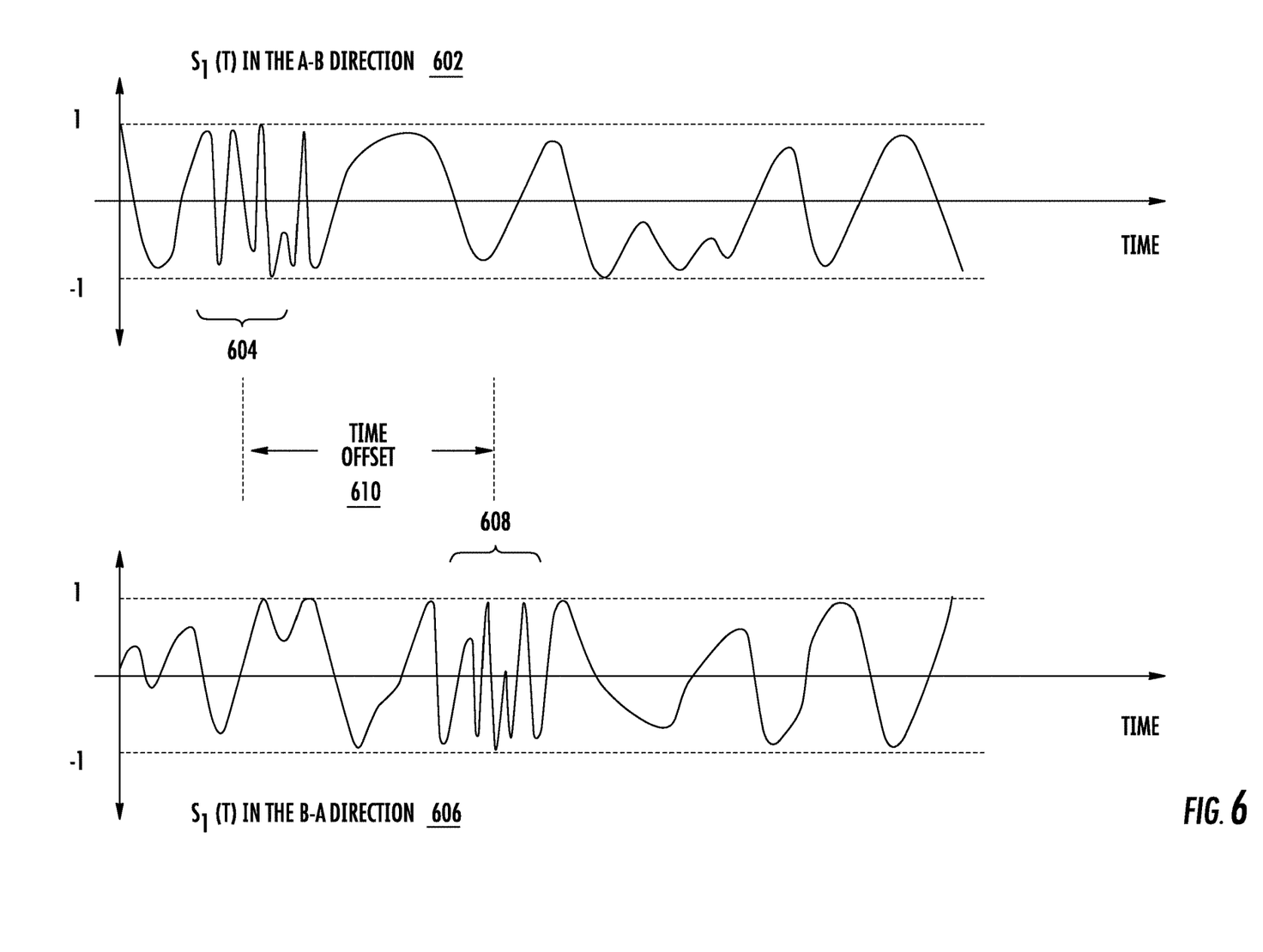
FIG. 6 illustrates an example estimation of time offset between two rapid fluctuation measurements in accordance with one or more embodiments of the disclosure.

FIG. 6 illustrates an example estimation of time offset between two rapid fluctuation measurements according to embodiments. As shown, graph 602 represents the recovered or received SOP for one part of each Stokes vector, e.g., $S_1$ parameter, in the 502-to-504 direction. Graph 606 charts the recovered or received SOP for the $S_1$ parameter in the 504-to-502 direction. In any one direction during the SOP recovery process, rapid polarization changes 604 and 608 may be observed, each at a particular time or time period. The rapid polarization changes 604 and 608 may indicate that there likely has been an external aggression (e.g., external aggression 540) on the optical cable. A rapid polarization change may be understood to mean an increase in the rate of polarization fluctuations, for example, a threshold number of polarization fluctuations in a predefined time period.

By observing the time offset or time-shift of the times or time periods corresponding to the rapid polarization changes 604 and 608 between the two directions of signal propagation, the location along the optical cable where the external aggression occurred can be estimated based on one or more known parameters, e.g., the speed at which the signals travel along the single-mode fiber (for example, five microseconds per kilometer), the length of the fiber. For example, if the time offset or time-shift was zero, then the location of the aggression may be at the center of the cable. In examples, to pinpoint a specific time associated with a rapid polarization change, an average, a median, etc. of the time period or time range where the rapid change occurs may be used.

It may be understood that there may be many suitable signal processing techniques for estimating the time difference. For instance, the $S_{502\text{-}to\text{-}504}$ and $S_{504\text{-}to\text{-}502}$ vectors may be high-pass filtered and cross-correlated to estimate the time offset that gives the largest correlation. Moreover, it may be understood that the time offset calculation may be performed at one terminal side, e.g., the receiver may receive rapid fluctuation data or other types of SOP-related data from other receiver(s) and estimate the time offset, and thus, the estimated location of the external aggression. Alternatively, the calculations may be performed by one or more "central" computing devices, such as server computers, at a central location and configured to receive all relevant data and to perform the calculations.

It may be understood that the figures and corresponding descriptions herein are only examples and/or may have been simplified for ease of explanation. In an undersea optical communication system, there may be hundreds of parallel receivers configured to detect multiple signal SOPs across several fiber pairs. Thus, there may be many more observations of received polarizations to improve the estimation of the location of the external aggression.

For example, in a wave division multiplex (WDM) system, there could be several fiber pairs, each carrying hundreds of different channels, which may mean "hundreds" of observations to perform multi-variate cross correlations. As set forth above, a coherent receiver may have approximately 50 kHz of polarization recovery bandwidth, which means that there may be approximately 1/50 kHz or 20 microsecond resolution to find the location of the aggression. It may be understood that 50 kHz is merely an example and may be any suitable polarization recovery bandwidth value. In some examples, optical signals may travel approximately five microseconds per kilometer in a single-mode fiber, and thus, it may be possible to locate the position of the external aggression within a few kilometers.

Moreover, it may be understood that polarization changes on the received signal caused by external aggression may start, maintain, and/or stop at random intervals during the physical movement of the cable. The estimation process for the time offset may be observed and averaged over several cycles to obtain a certain level of accuracy in the estimates. The estimation process may run continuously without any disruption to customer traffic on the fiber optic communication system, which advantageously provides a real-time (or substantially real-time) monitoring system for detecting and locating external aggression without adding any additional costs or equipment to the system.

Herein, novel and inventive system, apparatus, and techniques for detecting and locating external aggression on an optical cable are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical communication system comprising:
an apparatus comprising:
one or more processors operable to execute stored instructions that, when executed, cause the one or more processors to:
receive a first signal transmitted from a first transmitter via an optical cable;
perform analysis on the first signal to recover a first state-of-polarization (SOP) associated with the first signal;
determine whether a first rapid polarization change occurred based on the recovery of the first SOP, the first rapid polarization change indicating that an external aggression has occurred on the optical cable;
determine a first time or a first time period corresponding to the occurrence of the first rapid polarization change;
receive a second time or a second time period corresponding to an occurrence of a second rapid polarization change;
determine a first time offset between the first and second times or between the first and second time periods corresponding to the occurrences of the first and second rapid polarization changes; and
determine a first location of the external aggression on the optical cable based at least in part on the determined first time offset.

2. The optical communication system of claim 1, wherein the apparatus is a first receiver, and further comprising:
a remote apparatus, the remote apparatus being a second receiver comprising:
memory for storing one or more instructions;
one or more processors, coupled to the memory, operable to execute the one or more instructions, that when executed, cause the one or more processors to:
receive a second signal transmitted from a second transmitter;

perform analysis on the second signal to recover a second SOP associated with the second signal;

determine whether a second rapid polarization change occurred based on the recovery of the second SOP, the second rapid polarization change indicating that the external aggression has occurred on the optical cable; and determine the second time or the second time period corresponding to the occurrence of the second rapid polarization change; and send the second time or the second time period corresponding to the occurrence of the second rapid polarization change to the first receiver.

3. The optical communication system of claim 2, wherein the one or more processors of the second receiver is further caused to:

receive, from the first receiver, the first time or the first time period corresponding to the occurrence of the first rapid polarization change;

determine a second time offset between the first and second times or between the first and second time periods corresponding to the occurrences of the first and second rapid polarization changes; and determine, at the second receiver, a second location of the external aggression on the optical cable based at least in part on the determined second time offset.

4. The optical communication system of claim 2, wherein the first receiver and the second transmitter are included in a transponder located at a first terminal.

5. The optical communication system of claim 2, wherein the first transmitter and the second receiver are included in a second transponder located at a second terminal.

6. The optical communication system of claim 2, wherein the first receiver and the first transmitter are coherent, and the first transmitter implements a dual-polarization quadrature phase shift keying (DP-QPSK) modulation format for transmitting the first signal.

7. The optical communication system of claim 2, wherein the second receiver and the second transmitter are coherent, and the second transmitter implements a dual-polarization quadrature phase shift keying (DP-QPSK) modulation format for transmitting the second signal.

8. The optical communication system of claim 1, wherein the first rapid polarization change is a predetermined increase in a rate of one or more polarization fluctuations in a predefined time period.

9. The optical communication system of claim 1, wherein the first rapid polarization change is a predetermined number of one or more polarization fluctuations in predefined time period.

10. The optical communication system of claim 1, wherein the optical cable does not require any additional components to be arranged on the optical cable to estimate the location of the external aggression.

11. The optical communication system of claim 2, wherein the second rapid polarization change is a predetermined increase in a rate of one or more polarization fluctuations in a predefined time period.

12. An apparatus comprising:
memory for storing one or more instructions;
one or more processors, coupled to the memory, operable to execute the one or more instructions, that when executed, cause the one or more processors to:
receive a signal via at least one optical cable;
perform analysis on the signal to recover a state-of-polarization (SOP) associated with the signal;
determine whether a first rapid polarization change occurred based on the recovery of the SOP, the first rapid polarization change indicating that an external aggression has occurred on the at least one optical cable;
determine a first time or a first time period corresponding to the occurrence of the first rapid polarization change;
receive a second time or a second time period corresponding to an occurrence of a second rapid polarization change;
determine a time offset between the first and second times or between the first and second time periods corresponding to the occurrences of the first and second rapid polarization changes; and
determine a location of the external aggression on the at least one optical cable based at least in part on the determined time offset.

13. The apparatus of claim 12, wherein the apparatus is a coherent receiver of an optical communication system.

14. The apparatus of claim 12, wherein the recovery of the SOP comprises the one or more processors to analyze the SOP for each direction represented by a Stokes vector.

15. The apparatus of claim 12, wherein the first rapid polarization change is a predetermined increase in a rate of one or more polarization fluctuations in a predefined time period.

16. The apparatus of claim 12, wherein the first rapid polarization change is a predetermined number of one or more polarization fluctuations in predefined time period.

17. A method comprising:
receiving a signal from a transmitter via at least one optical cable;
performing, via one or more processors of an apparatus, analysis on the signal to recover a state-of-polarization (SOP) associated with the signal;
determining, via the one or more processors, whether a first rapid polarization change occurred based on the recovery of the SOP, the first rapid polarization change indicating that an external aggression has occurred on the at least one optical cable;
determining, via the one or more processors, a first time or a first time period corresponding to the occurrence of the first rapid polarization change;
receiving a second time or a second time period corresponding to an occurrence of a second rapid polarization change;
determining, via the one or more processors, a time offset between the first and second times or between the first and second time periods corresponding to the occurrences of the first and second rapid polarization changes; and
determining, via the one or more processors, a location of the external aggression on the at least one optical cable based at least in part on the determined time offset.

18. The optical communication system of claim 1, wherein the one or more processors are further caused to:
receive or detect horizontal and vertical polarizations in the first signal; and
recover: (i) data from a first set of binary data streams modulated on an x-polarization by extracting and adding polarizations corresponding to first and second axes and (ii) data from a second set of binary data streams modulated on a y-polarization by extracting and adding polarizations corresponding to third and fourth axes, and
wherein the first, second, third, and fourth axes are different from each other.

19. The optical communication system of claim 1, wherein the determination of the first time offset further comprises the one or more processors to:
   observe or average the first and second times or the first and second time periods corresponding to the occurrences of the first and second rapid polarization changes over a plurality of cycles; and
   determine whether a predefined level of accuracy of the first time offset is achieved based on the observation or averaging.

* * * * *